US012681939B2

(12) United States Patent
Marudi et al.

(10) Patent No.: US 12,681,939 B2
(45) Date of Patent: Jul. 14, 2026

(54) FRAMEWORK FOR GENERATING RELEVANT INFORMATION FOR ARTIFICIAL INTELLIGENCE MODELS

(71) Applicant: PAYPAL, INC., San Jose, CA (US)

(72) Inventors: Matan Marudi, Kiryat ono (IL); Adva Berta Helman, Nofekh (IL); Avi Simkin, Haifa (IL)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 18/899,660

(22) Filed: Sep. 27, 2024

(65) Prior Publication Data

US 2026/0093704 A1     Apr. 2, 2026

(51) Int. Cl.
*G06F 16/2457* (2019.01)
*G06F 16/93* (2019.01)

(52) U.S. Cl.
CPC ........ *G06F 16/24578* (2019.01); *G06F 16/93* (2019.01)

(58) Field of Classification Search
CPC .......................... G06F 16/93; G06F 16/24578
See application file for complete search history.

(56) References Cited

U.S. PATENT DOCUMENTS

| | | | | |
|---|---|---|---|---|
| 11,861,321 | B1 * | 1/2024 | O'Kelly | G06F 16/33 |
| 2009/0024598 | A1 * | 1/2009 | Xie | G06F 16/3326 |
| 2021/0191926 | A1 * | 6/2021 | Izenson | G06N 5/04 |
| 2022/0318255 | A1 * | 10/2022 | Fei | G06F 16/24578 |
| 2023/0004819 | A1 * | 1/2023 | Qu | G06F 16/3347 |
| 2024/0354512 | A1 * | 10/2024 | Karanam | G06F 40/30 |
| 2025/0045336 | A1 * | 2/2025 | Gonsalves | G06F 40/166 |
| 2025/0094429 | A1 * | 3/2025 | Raghavan | G06F 16/248 |
| 2025/0315866 | A1 * | 10/2025 | Kelly | G06Q 30/0281 |

* cited by examiner

*Primary Examiner* — Tarek Chbouki
(74) *Attorney, Agent, or Firm* — Haynes and Boone, LLP

(57) ABSTRACT

Methods and systems are presented for providing a retrieval-augmented generation (RAG) framework that provides information associated with a particular domain to an artificial intelligence (AI). The RAG framework includes a query generation module that generates additional queries based on an original user query. A set of documents is retrieved from a corpus based on the user query and the additional queries. The RAG framework further includes an evaluation module for evaluating a relevancy of each retrieved document with respect to the original user query. Any documents determined to be irrelevant to the original user query may be eliminated, and the remaining documents along with the original user query are used to generate a prompt for the AI model, which in turn, generates a response to the user query.

20 Claims, 8 Drawing Sheets

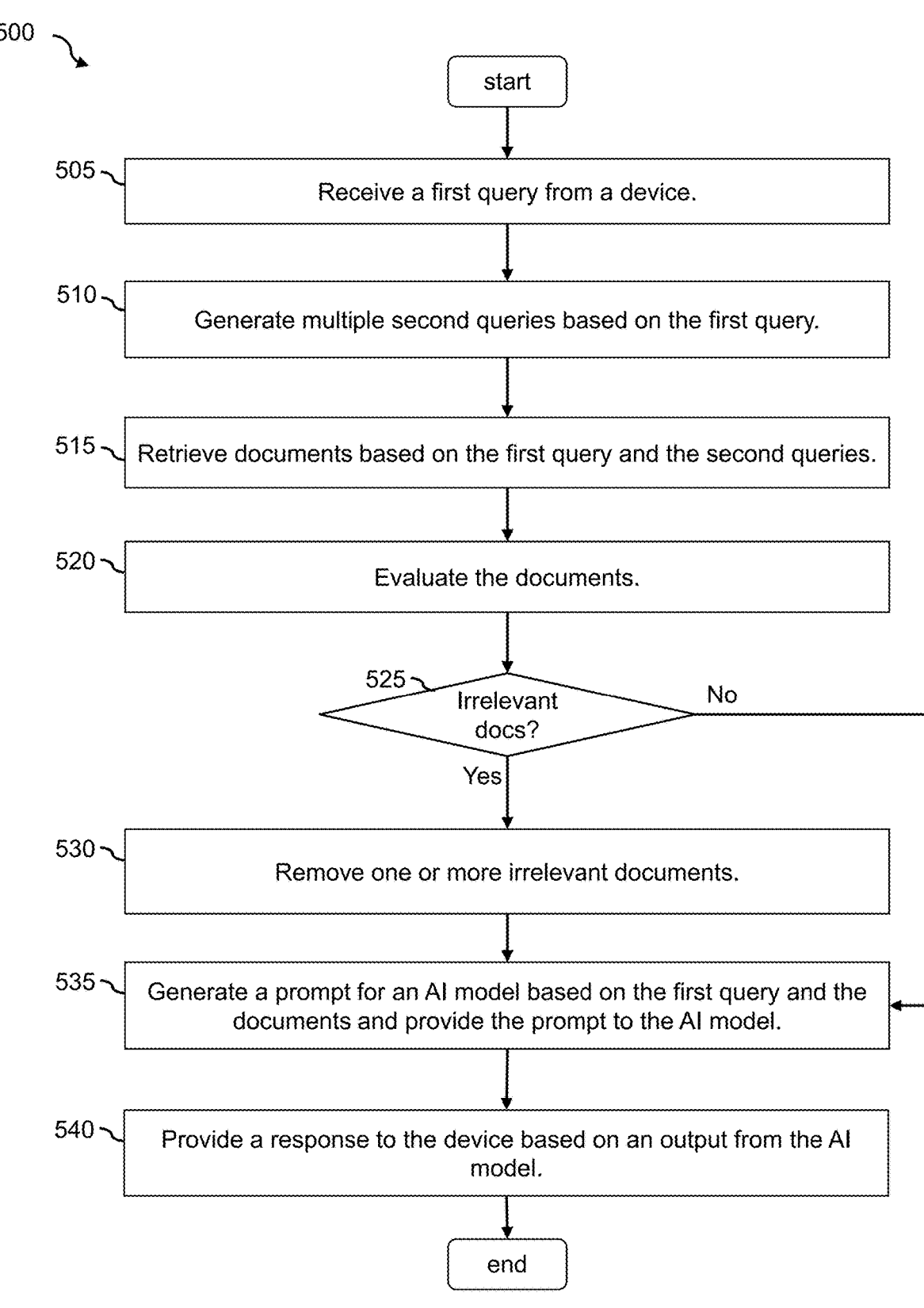

500 start

505 — Receive a first query from a device.

510 — Generate multiple second queries based on the first query.

515 — Retrieve documents based on the first query and the second queries.

520 — Evaluate the documents.

525 — Irrelevant docs?

No

Yes

530 — Remove one or more irrelevant documents.

535 — Generate a prompt for an AI model based on the first query and the documents and provide the prompt to the AI model.

540 — Provide a response to the device based on an output from the AI model.

end

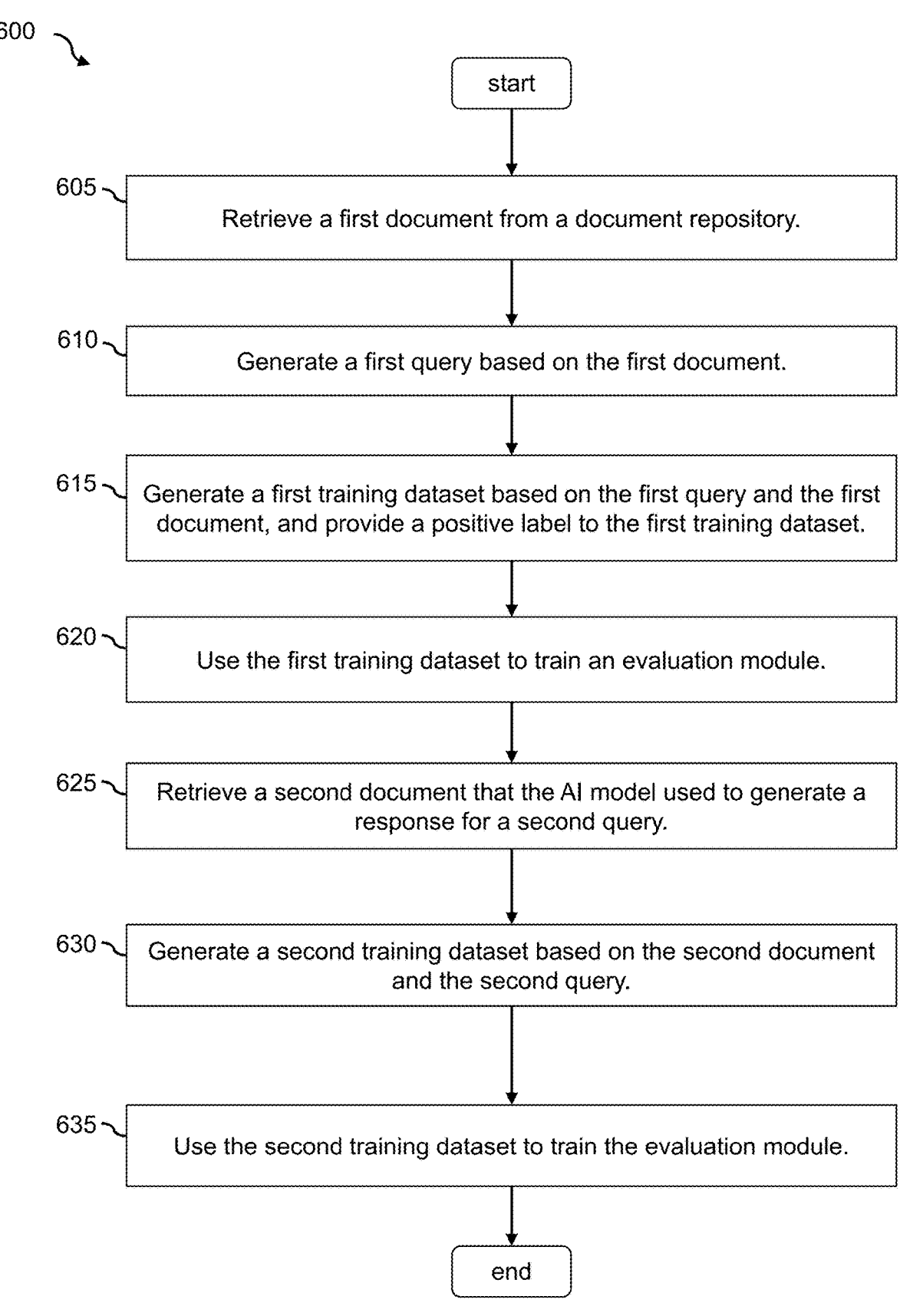

start

605 — Retrieve a first document from a document repository.

610 — Generate a first query based on the first document.

615 — Generate a first training dataset based on the first query and the first document, and provide a positive label to the first training dataset.

620 — Use the first training dataset to train an evaluation module.

625 — Retrieve a second document that the AI model used to generate a response for a second query.

630 — Generate a second training dataset based on the second document and the second query.

635 — Use the second training dataset to train the evaluation module.

end

Figure 6

FRAMEWORK FOR GENERATING RELEVANT INFORMATION FOR ARTIFICIAL INTELLIGENCE MODELS

BACKGROUND

The present specification generally relates to an artificial intelligence model framework, and more specifically, to providing a framework that uses a machine learning model to assist in providing relevant information for an artificial intelligence model according to various embodiments of the disclosure.

RELATED ART

Artificial intelligence (AI) models, such as large language models (LLMs), have been used by organizations to facilitate automated dialogue-based interactions with users. Typical LLMs, such as GPT-4, BERT, LLaMA, etc., are powerful and flexible as they are capable of learning and generating content (e.g., responses to user-queries) in a natural language format across a wide range of subject matters (also referred to as "domains"). However, while these generic AI models are trained to provide responses in a wide range of subject matters, they are not specialized in any particular subject matter. For example, a generic AI model may not be trained to provide information specifically associated with an organization (e.g., answering questions related to the organization, such as how to perform a task on a website of the organization, etc.). As such, the generic AI model may require assistance in generating responses for a particular domain. In this regard, a retrieval-augmented generation (RAG) framework can be used to retrieve additional information (e.g., internal documents of the organization, etc.) based on a user query, and provide the additional information to the AI model, such that the AI model can generate a response for the user query using the content from the additional information.

Due to the usage of tools such as the RAG framework, the quality of the response from the AI model is largely dependent on the quality (e.g., volume, relevancy, etc.) of the additional information that is provided to the AI model. When the scope of the additional information is overly broad (e.g., the additional information includes a substantial amount of information that is irrelevant to the user query), overly narrow (e.g., the additional information lacks sufficient information that is relevant to the user query), or incorrect or not useful (e.g., the additional information is not relevant to the user query), the quality or accuracy of the response suffers. It has been a challenge for a RAG framework to balance the scope of the data retrieval process, such that a sufficient amount of information that is relevant to the user query is retrieved, without including excessive irrelevant information. Thus, there is a need for an improved RAG framework for performing data retrieval for AI models.

BRIEF DESCRIPTION OF THE FIGURES

FIG. 5 is a flowchart showing a process of facilitating an automated conversation between a chat system and a user according to an embodiment of the present disclosure;

FIG. 6 is a flowchart showing a process of training an evaluation module according to an embodiment of the present disclosure;

Figure 1:
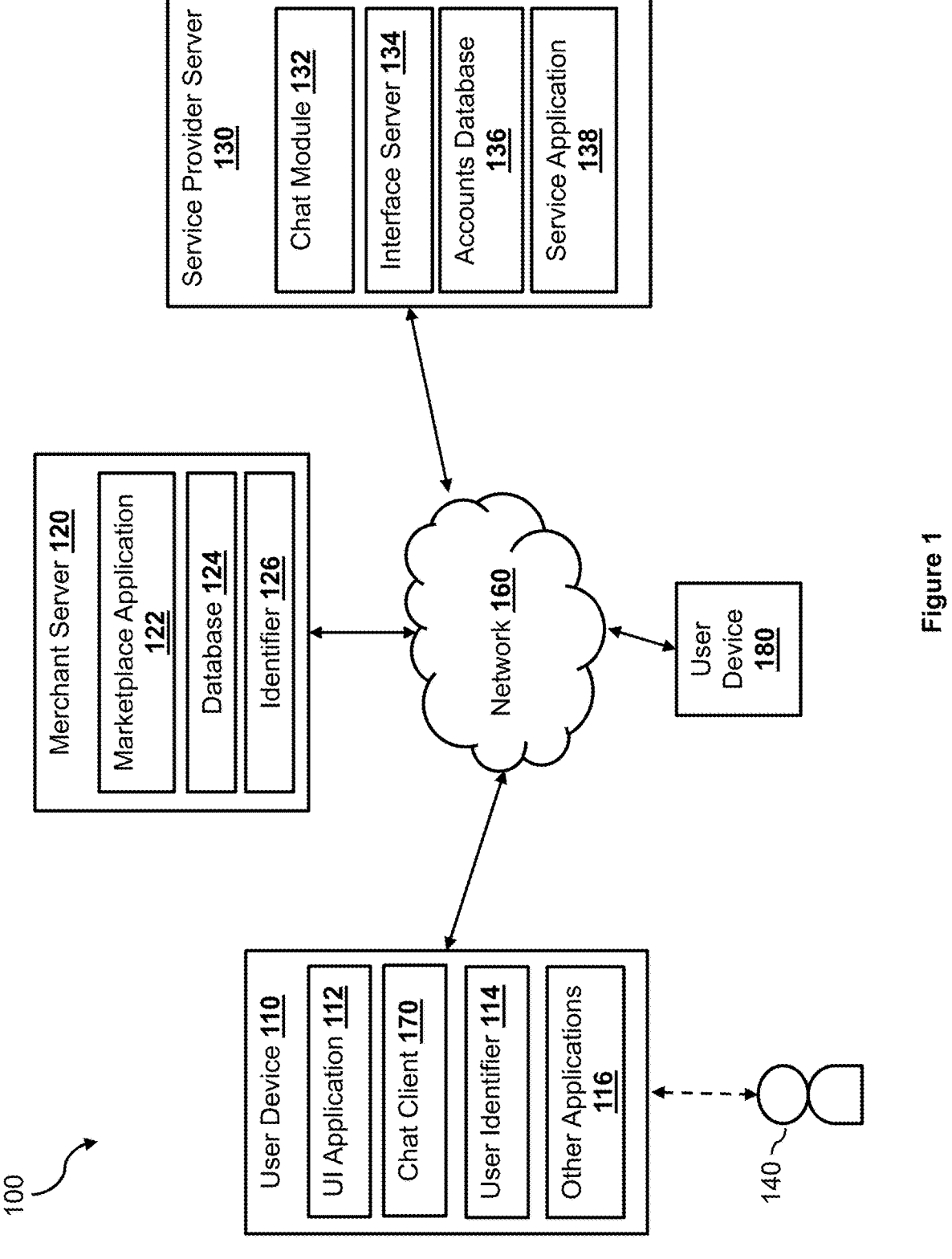
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for providing a retrieval-augmented generation (RAG) framework that provides information associated with a particular domain to an artificial intelligence (AI) model, which improves the capability of the AI model to generate a response to a user query. As discussed herein, AI models are typically trained to provide generic information about a wide range of domains, but are not trained to provide responses that are specific to any particular domain (e.g., not trained to provide information related to specific processes, procedures, and policies associated with a particular organization, etc.). For example, when the user query is related to a question on how to perform a certain transaction with the organization (e.g., how to perform a dispute of a transaction through a website of the organization, etc.), it would not be very useful if the AI model provides a response that includes information on how to perform the transaction in an environment outside the organization (e.g., steps of performing the transaction with another organization, etc.).

In some embodiments, in order for an organization to use an AI model to provide information specific to a particular domain (e.g., specific to the organization, etc.) to its users, an RAG framework can be used. An RAG framework may assist the AI model to generate responses within a particular domain by retrieving information related to the user query from a pre-defined corpus, and provide the information along with the user query to the AI model. For example, an organization may compile documents (e.g., white papers, webpages, articles, internal instructions, etc.) that are related to a particular domain (e.g., information associated with the organization, etc.) to form a corpus for the RAG framework. Documents, as used herein, may be in any format (digital/ electronic or non-digital/physical) that includes data, content, or information, which can have or not have size limits. In some embodiments, the organization may not include any documents that are not part of the organization in the corpus. As a chat system associated with the organization receives a user query from a device, instead of providing the user query directly to the AI model, the chat system may first use a retrieval module of the RAG framework to retrieve information relevant to the user query from the corpus.

For example, when the user query includes a question about how to dispute a transaction through a website of the organization, the retrieval module may retrieve documents from the corpus that are specifically related to instructions in filing a dispute of a transaction on the organization's web- site. In another example, when the user query includes a question about how to reset a password, the retrieval module may retrieve documents from the corpus that are specifically related to resetting passwords. The chat system may then generate a prompt for the AI model based on the user query and the information (e.g., the documents, etc.) retrieved by the retrieval module. The AI model may then generate a response using the information provided by the retrieval module. Since the documents in the corpus include content specifically related to the organization, by using the infor- mation retrieved by the retrieval module of the RAG frame- work in addition to the user query, the AI model is able to generate a response that is associated with the particular domain (e.g., information related to the organization). For example, by using the RAG framework, the AI model may generate a response that includes specific instructions on how to perform a transaction with the organization based on the relevant information from the corpus.

Since the AI model generates responses based on the information retrieved by the retrieval module, the quality of the response is largely dependent on the quality of the information (e.g., the amount of information included in the additional information, the relevancy of the additional infor- mation to the user query, the type of information of the additional information, etc.) and therefore, the performance of the retrieval module. As defined herein, information is relevant to the query when the information includes content that is associated with the query (e.g., information that is usable to answer the query, etc.), content that is requested by the user, or that is usable by the AI model to generate a response that provides an answer requested by the user. Information is irrelevant to the query when the information is not associated with the query, does not include content that is requested by the user who submitted the query, or that does not enable the AI model to generate a response that provides an answer requested by the user. Different tech- niques have been used to improve the performance of the retrieval module in retrieving relevant information for a given user query. For example, since the user queries are typically generated by users during a chat session, the user queries may not be optimal for querying the corpus for retrieving relevant information (e.g., the user queries may not include all of the relevant keywords, the user queries may not provide the necessary context, the user queries may include typographical errors, etc.). As such, the RAG frame- work may include a query generation module configured to generate additional queries for querying the corpus based on a user query.

The query generation module may generate the additional queries using different techniques. In some embodiments, the query generation module generates additional queries by replacing one or more words in the user query with different words of similar meanings or related context (e.g., replacing "payment" with "transaction," replacing "how" with "what are the steps for," replacing "generate" with "create," etc.). The query generation module may also generate additional queries by adding context information to the user query. Since the user query may be part of a sequence of dialogues between the user and a chat system of the organization, the query generation module may analyze the dialogues between the user and the chat system to generate a context. The query generation module may then incorporate the context into the user query. For example, the user may be discussing a particular payment transaction having transac- tion ID #1234 with the chat system before submitting a query "how do I dispute that?". In this example, the query generation module may generate an additional query by incorporating the context of the conversation into the query, such as "how do I dispute the payment transaction having transaction ID #1234?".

In some embodiments, the additional queries expand the scope of the original query and/or change the scope of the original query. Each additional query may be used to retrieve a set of documents from the corpus. As such, by using the additional queries, in addition to the original user query, to query the corpus, a larger amount of documents may be retrieved by the RAG framework, which may enrich the information that is provided to the AI model for generating a response. In some embodiments, the query generation module is implemented as a large language model to gen- erate multiple queries from different perspectives based on the original user query. However, some of the generated queries may stray too far away from the scope of the original user query, and produce documents that are irrelevant to the user query.

In some embodiments, the query generation module includes one or more parameters that enables the RAG framework to adjust the scope of the additional queries generated based on a user query. When the parameter specifies a broader scope, the query generation module may generate the additional queries by performing more substan- tial (e.g., more liberal) modifications to the original user query. Conversely, when the parameter specifies a narrower scope, the query generation module may generate the addi- tional queries by performing less substantial (e.g., more conservative) modifications to the original user query. As such, in order to reduce the amount of irrelevant resulting documents, one can lower the temperature of the query generation module (that is, adjusting the one or more param- eters to reduce the variability of the additional queries). However, such an adjustability only provides limited flex- ibility and control over the scope of the information being retrieved. For example, by lowering the temperature of the query generation module, the diversity of the generated queries is reduced, and in turn, limits the number of docu- ments produced by the retrieval module that are possibly relevant to the user query.

As such, according to various embodiments of the dis- closure, the RAG framework includes a mechanism that refines the retrieval process in real-time without requiring manual intervention. The mechanism can be implemented as an evaluation module for evaluating the information that is retrieved by the retrieval module based on the original user query and the additional queries generated by the query generation module. In some embodiments, the evaluation module is implemented as a machine learning model (e.g., an artificial neural network, a large language model, etc.) that has a less complex internal structure (e.g., smaller number of parameters, etc.) than the query generation mod- ule and that is trained using a reverse labeling technique. Using the RAG framework as disclosed herein, the evalu- ation module may be used to evaluate some or all of the documents retrieved by the retrieval module. In some embodiments, the evaluation module assigns a score to each of the documents, indicating a relevancy of the document with respect to the original user query. The evaluation module may provide only the documents with relevancy higher than a threshold to the AI model (e.g., included in the prompt along with the original user query). This way, the query generation module can be configured with a higher temperature (that is, allowing the query generation module to generate queries that are substantially different from the original user query in order to retrieve a larger pool of documents), and the evaluation module can refine the pool of documents to eliminate irrelevant documents, such that the quality of the resulting documents that are provided to the AI model is substantially improved. Such a process produces information that is in substantially higher quality than a retrieval of information using solely the original user query (or solely using the original user query and the additional queries), which improves the performance of the AI model in generating the response to the original user query.

The evaluation module may be implemented as another AI model that is trained in two separate phases. In the first (e.g., initial) training phase, a training module may use a reverse labeling technique to generate a first or initial set of training data. For example, the training module may retrieve documents from the corpus of the RAG framework. The training module may then generate a query for each of the documents. In some embodiments, the training module may include a model (e.g., a large language model, etc.) configured to generate the queries for the documents. For example, the training module may provide a document to the model. By analyzing the content of the document, the model may be trained to generate a query that is relevant to the document. For example, when the document includes information and/or instructions on how to reset a password, the model may be trained to generate a query such as "how do I reset a password?".

In some embodiments, the model of the training module may be trained using a few-shot learning technique. Since it is time consuming for a human agent to generate queries based on the content of the documents, the training module may obtain queries generated by the human agent based on only a few samples (e.g., less than a threshold) of documents. In order to maximize the training performance using only a few labeled training datasets (e.g., the human agent-generated queries and the documents), the training module may obtain documents that cover a wide variety of topics for the human agent to generate the queries. The training module may then use the query/document pairs to train the query model based on the few-shot learning technique.

After using the model to generate queries for the documents, the training module may generate training data for the evaluation module. For example, the training module may generate a training dataset by pairing a document and a corresponding query generated for the document by the model. The training module may also assign a positive label to the document, indicating that the document is relevant to the query (since the query was generated specifically based on the document, the training module may determine that the document is relevant to the query, that is, the document includes content that is usable to answer the query). The training module may generate multiple training datasets based on different document/query pairs, and use the training datasets to train the evaluation module. For example, the training module may provide the query and the document as input data to the evaluation module, and provide feedback to the evaluation module based on an output of the evaluation module (e.g., providing a positive feedback if the output indicates that the document is relevant to the query, and providing a negative feedback if the output indicates that the document is not relevant to the query).

The evaluation module may then be deployed for evaluating the documents retrieved by the retrieval module. For example, as the retrieval module retrieves a set of documents based on the original user query and the additional queries generated by the query generation module, the evaluation module may evaluate each of the documents in the set of documents to determine if the document is relevant to the original user query. The retrieval module may provide the original user query and a document from the set of documents as input data to the evaluation module, and may obtain an output (e.g., a relevancy score) indicating a relevancy of the document to the original user query. The retrieval module may use the evaluation module to evaluate each of the documents, and only retain the documents having a relevancy score above a threshold. In some embodiments, the retrieval module may only use the evaluation module to evaluate documents that are retrieved based on any one of the additional queries, but not the original user query. The retrieval module may then generate a prompt for the AI model based on the original user query and the retained documents (documents having relevancy scores higher than the threshold). The AI model may generate a response to the user query based on the prompt, and may provide the response to the user (e.g., via the chat system).

In some embodiments, the evaluation module is trained subsequently in an ongoing basis after the first or initial training phase. For example, after deploying the evaluation module, the training module may continue to monitor the dialogues exchanged between the chat system and the various users. In some embodiments, after the AI model provides a response to a user query, the training module monitors and analyzes the reaction from the user, and determines whether the user provides a positive feedback or a negative feedback to the response. For example, if the user repeats the user query after the AI model provides a response, the training module may determine that a negative feedback is provided to the response. On the other hand, if the user replies with an affirmative utterance such as an indication of an understanding of the response (e.g., "got it," etc.) or an appreciation of the response (e.g., "thank you," "thanks," etc.), the training module may determine that a positive feedback is provided to the response. The training module may then generate additional training datasets based on the user query and the documents that were used by the AI model to generate the response. For example, the training module may label the documents in the training datasets with a corresponding label based on the feedback from the user (e.g., a positive label for documents used in a response that receive a positive feedback, a negative label for documents used in a response that receive a negative feedback, etc.). The training module may then re-train the evaluation module based on the training datasets generated using real-world feedback data.

In some embodiments, the training module may use an unsupervised feedback loop to continue to fine-tune the evaluation module. The training module may provide each pair of query and document from the training datasets as input data to the AI model. When the AI model generates a response to the query, the training module may calculate a confidence score indicating a confidence level that the response accurately or correctly answers the query. In some embodiments, the training module may generate the confidence score based on the last layer of the multiple layers within the AI model structure. For example, the training module may calculate the confidence score based on an entropy of the token values in the last layer of the AI model when the AI model generates the response.

Based on the confidence score, the training module may reinforce the training of the evaluation module using one or more methods. For example, the training module may select the query/document pairs having confidence scores above a threshold, and re-train the evaluation module based on the selected query/document pairs (e.g., adjusting the parameters of the evaluation module such that the evaluation module will produce a positive output based on the query/document pairs). In another example, the training module may provide feedback to the evaluation module using a binary-cross-entropy loss between a softmax score of the "yes" token in the last layer of the AI model and the generated confidence score. Using real-world feedback data and confidence scores generated based on the AI model to continue to re-train (fine-tune) the evaluation module, the performance of the evaluation module will continue to improve, resulting in a higher quality of responses produced by the AI model.

FIG. 1 illustrates an electronic transaction system 100, within which the RAG framework may be implemented according to one or more embodiments of the disclosure. The electronic transaction system 100 includes a service provider server 130, a merchant server 120, and user devices 110 and 180 that may be communicatively coupled with each other via a network 160. The network 160, in one embodiment, is implemented as a single network or a combination of multiple networks. For example, in various embodiments, the network 160 includes the Internet and/or one or more intranets, landline networks, wireless networks, and/or other appropriate types of communication networks. In another example, the network 160 comprises a wireless telecommunications network (e.g., cellular phone network) adapted to communicate with other communication networks, such as the Internet.

The user device 110, in one embodiment, is utilized by a user 140 to interact with the merchant server 120 and/or the service provider server 130 over the network 160. For example, the user 140 uses the user device 110 to conduct an online purchase transaction with the merchant server 120 via websites hosted by, or mobile applications associated with, the merchant server 120. The user 140 also logs in to a user account to access account services or conduct electronic transactions (e.g., data access, account transfers or payments, etc.) with the service provider server 130. The user device 110, in various embodiments, is implemented using any appropriate combination of hardware and/or software configured for wired and/or wireless communication over the network 160. In various implementations, the user device 110 includes at least one of a wireless cellular phone, wearable computing device, PC, laptop, etc.

The user device 110, in one embodiment, includes a user interface (UI) application 112 (e.g., a web browser, a mobile payment application, etc.), which may be utilized by the user 140 to interact with the merchant server 120 and/or the service provider server 130 over the network 160. In one implementation, the user interface application 112 includes a software program (e.g., a mobile application) that provides a graphical user interface (GUI) for the user 140 to interface and communicate with the service provider server 130 and/or the merchant server 120 via the network 160. In another implementation, the user interface application 112 includes a browser module that provides a network interface to browse information available over the network 160. For example, the user interface application 112 may be implemented, in part, as a web browser to view information available over the network 160. Thus, the user 140 may use the user interface application 112 to initiate electronic transactions with the merchant server 120 and/or the service provider server 130.

The user device 110 may also include a chat client 170 for facilitating online chat sessions with another chat client (e.g., a chat client of another device, such as the user device 180, the chat module 132 of the service provider server 130, etc.). The chat client 170 may be a software application executed on the user device 110 for providing a chat client interface for the user 140 and for exchanging (e.g., transmitting and receiving) messages with the other chat client (either via a peer-to-peer chat protocol or via a chat server). For example, during an online chat session with the chat module 132, the chat client 170 presents a chat interface that enables the user 140 to input data (e.g., text data such as utterances, audio data, multi-media data, etc.) for transmitting to the chat module 132. The chat interface of the chat client 170 may also present messages that are received from the chat module 132. In some embodiments, the messages are presented on the chat client interface in a chronological order according to a chat flow of the online chat session. The chat client 170 may be an embedded application that is embedded within another application, such as the UI application 112. Alternatively, the chat client 170 may be a stand-alone chat client program (e.g., a mobile app such as WhatsApp®, Facebook® Messenger, iMessages®, etc.) that is not associated with any other software applications executed on the user device 110.

The user device 110, in various embodiments, includes other applications 116 as may be desired in one or more embodiments of the present disclosure to provide additional features available to the user 140. In one example, such other applications 116 include security applications for implementing client-side security features, programmatic client applications for interfacing with appropriate application programming interfaces (APIs) over the network 160, and/or various other types of generally known programs and/or software applications. In still other examples, the other applications 116 interface with the user interface application 112 and/or the chat client 170 for improved efficiency and convenience.

The user device 110, in one embodiment, includes at least one identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user with a particular user account (e.g., and a particular profile).

In various implementations, the user 140 is able to input data and information into an input component (e.g., a keyboard) of the user device 110. For example, the user 140 may use the input component to interact with the UI application 112 (e.g., to conduct a purchase transaction with the merchant server 120 and/or the service provider server 130, to initiate a chargeback transaction request, etc.). In another example, the user 140 may use the input component to interact with the chat client 170 (e.g., to provide utterances to be transmitted to other chat clients, to a chat server, etc.). Utterances can be provided or initiated via text or audio. The user 140 may transmit questions/inquiries, and/or requests for performing certain tasks/transactions using the input component. In some embodiments, if the chat client 170 is integrated within another application (e.g., the UI application 112, etc.), the chat client may automatically access account data of the user via a platform (e.g., a website, etc.) accessed by the UI application, and may provide the relevant account data to another chat client or a chat server for performing the tasks/transactions.

The user device 180 may include substantially the same hardware and/or software components as the user device 110, which may be used by a user to interact with the merchant server 120 and/or the service provider server 130.

The merchant server 120, in various embodiments, may be maintained by a business entity (or in some cases, by a partner of a business entity that processes transactions on behalf of the business entity). Examples of business entities include merchants, resource information providers, utility providers, online retailers, real estate management providers, social networking platforms, a cryptocurrency brokerage platform, etc., which offer various items, content, and/or services for purchase and process payments for the purchases. The merchant server 120 may include a merchant database 124 for identifying available items, content, or services, which may be made available to the user devices 110 and 180 for viewing and purchase by the respective users.

The merchant server 120, in one embodiment, may include a marketplace application 122, which may be configured to provide information over the network 160 to the user interface application 112 of the user device 110. In one embodiment, the marketplace application 122 may include a web server that hosts a merchant website for the merchant. For example, the user 140 of the user device 110 (or the user of the user device 180) may interact with the marketplace application 122 through the user interface application 112 over the network 160 to search and view various items, content, or services available for purchase in the merchant database 124. The merchant server 120, in one embodiment, includes at least one merchant identifier 126, which may be included as part of the one or more items, content, or services made available for purchase so that, e.g., particular items and/or transactions are associated with the particular merchants. In one implementation, the merchant identifier 126 includes one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

While only one merchant server 120 is shown in FIG. 1, it has been contemplated that multiple merchant servers, each associated with a different merchant, may be connected to the user device 110 and the service provider server 130 via the network 160.

The service provider server 130, in one embodiment, is maintained by a transaction processing entity or an online service provider, which provides processing of electronic transactions between users (e.g., the user 140 and users of other user devices, etc.) and/or between users and one or more merchants. As such, the service provider server 130 includes a service application 138, which may be adapted to interact with the user device 110, user device 180, and/or the merchant server 120 over the network 160 to facilitate the electronic transactions (e.g., electronic payment transactions, data access transactions, etc.) among users and merchants processed by the service provider server 130. In one example, the service provider server 130 is provided by PayPal®, Inc., of San Jose, California, USA, and/or one or more service entities or a respective intermediary that provide multiple point of sale devices at various locations to facilitate transaction routings between merchants and, for example, service entities.

In some embodiments, the service application 138 includes a payment processing application (not shown) for processing purchases and/or payments for electronic transactions between a user and a merchant or between any two entities (e.g., between two users, between two merchants, etc.). In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 also includes an interface server 134 that is configured to serve content (e.g., web content) to users and interact with users. For example, the interface server 134 includes a web server configured to serve web content in response to HTTP requests. In another example, the interface server 134 includes an application server configured to interact with a corresponding application (e.g., a service provider mobile application) installed on the user devices 110 and 180 via one or more protocols (e.g., RESTAPI, SOAP, etc.). As such, the interface server 134 may include pre-generated electronic content ready to be served to users. For example, the interface server 134 stores a log-in page and is configured to serve the log-in page to users for logging into user accounts of the users to access various services provided by the service provider server 130. The interface server 134 may also include other electronic pages associated with the different services (e.g., electronic transaction services, etc.) offered by the service provider server 130. As a result, a user (e.g., the user 140, the user of the user device 180, or a merchant associated with the merchant server 120, etc.) may access a user account associated with the user and access various services offered by the service provider server 130, by generating HTTP requests directed at the service provider server 130.

The service provider server 130, in one embodiment, is configured to maintain one or more user accounts and merchant accounts in an accounts database 136, each of which may be associated with a profile and may include account information associated with one or more individual users (e.g., the user 140 associated with user device 110, the user associated with the user device 180, etc.) and merchants. For example, account information includes private financial information of users and merchants, such as one or more account numbers, passwords, credit card information, banking information, digital wallets used, or other types of financial information, transaction history, Internet Protocol (IP) addresses, device information associated with the user account. In certain embodiments, account information also includes user purchase profile information such as account funding options and payment options associated with the user, payment information, receipts, and other information collected in response to completed funding and/or payment transactions. It is noted that the accounts database 136 (and/or any other database used by the system disclosed herein may be implemented within the service provider server 130 or external to the service provider server 130 (e.g., implemented in a cloud, etc.).

In one implementation, a user has identity attributes stored with the service provider server 130, and the user has credentials to authenticate or verify identity with the service provider server 130. User attributes may include personal information, banking information and/or funding sources. In various aspects, one or more of the user attributes are passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device.

In various embodiments, the service provider server 130 also includes a chat module 132 that implements the RAG framework as discussed herein. In some embodiments, the chat module 132 may provide a user interface on devices (e.g., the user device 110, the user device 180, the merchant server 120, etc.) that enables users to submit utterances, such as questions related to an organization associated with the service provider server 130, requests for performing a transaction, etc. For example, the chat module 132 may include or have access to a chat server (not shown) that can facilitate and maintain chat sessions with different chat clients (e.g., the chat client 170, and other chat clients). The chat module 132 may use the chat server to establish chat sessions with different chat clients, and conduct conversations with different users via the chat sessions.

Based on the user inputs (e.g., utterances submitted by the user via a chat interface from voice or text), the chat module 132 may generate content in response to the user inputs. For example, when the user 140 of the user device 110 submits an utterance "how do I file a dispute for a transaction," the chat module 132 may generate content (e.g., a response, etc.) related to instructions on how to file a dispute based on information related to the organization, and may transmit the generated content to the user via the chat interface as a response to the user inputs.

In another example, when the user 140 of the user device 110 submits an utterance "I want to file a dispute for a transaction," the chat module 132 may generate content (e.g., one or more prompts, etc.) that asks the user for information required to process a dispute (e.g., a selection of a particular transaction that the user wants to dispute, a reason for the dispute, etc.), and may process the transaction (e.g., the dispute transaction) for the user based on the information.

Figure 2:
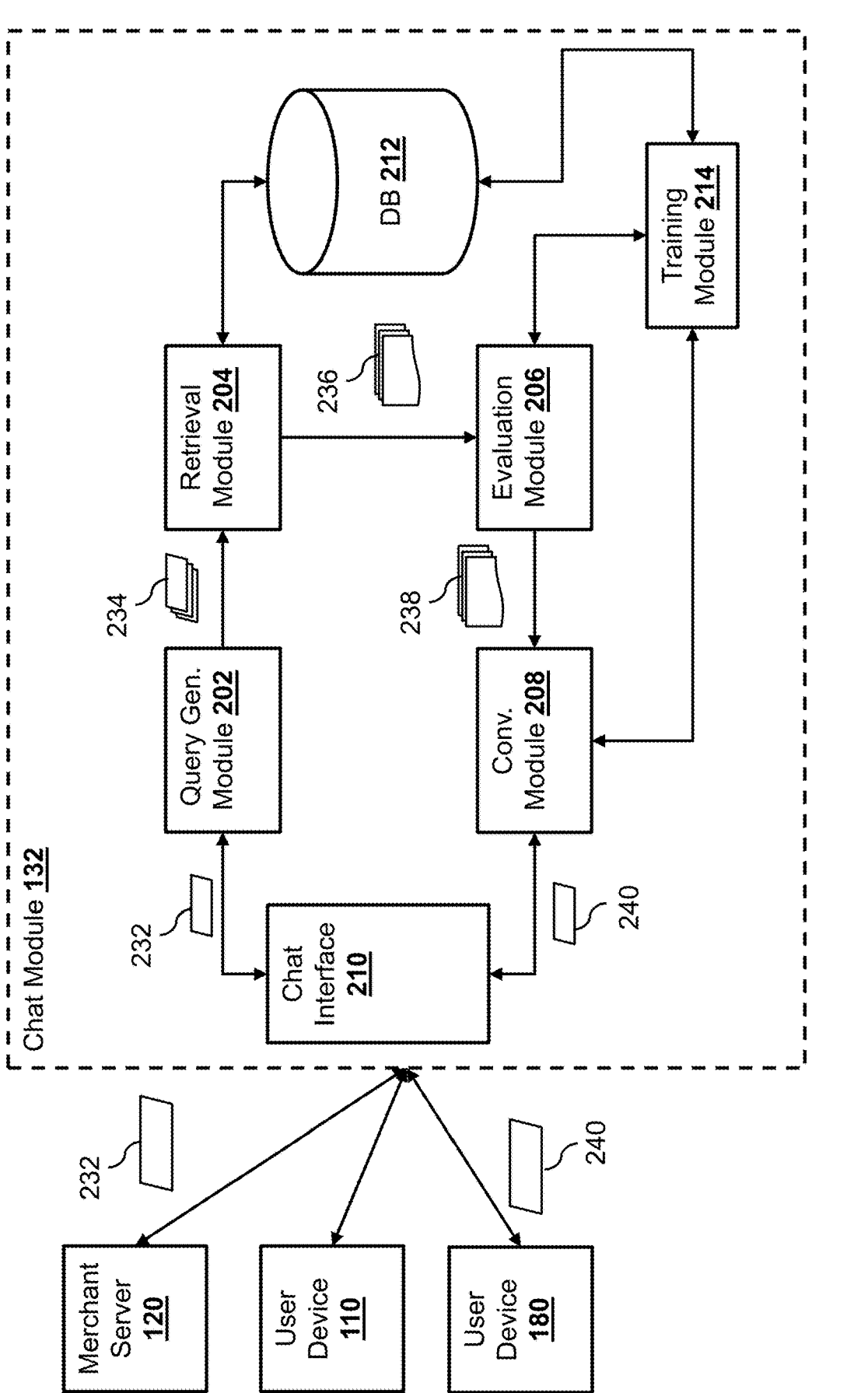
FIG. 2 is a block diagram illustrating a chat module according to an embodiment of the present disclosure.

FIG. 2 illustrates a block diagram of the chat module 132 according to an embodiment of the disclosure. The chat module 132 includes a query generation module 202, a retrieval module 204, an evaluation module 206, a conversation module 208, a chat interface 210, a training module 214, and a database 212. In some embodiments, each of the query generation module 202, the evaluation module 206, the conversation module 208, and the training module 214 is implemented as (or includes) an AI model (e.g., a large language model, etc.). The chat interface 210 may be configured to establish and/or maintain communication sessions (also referred to as "chat sessions") with various chat clients of different user devices, such as the chat client 170 of the user device 110, a chat client of the merchant server 120, a chat client of the user device 180, etc. For example, when the user 140 uses the chat client 170 to initiate a chat session with the conversation module 132, the chat interface 210 may establish a chat session with the chat client 170 using a particular protocol, which includes performing one or more handshakes with the chat client 170 to establish and assign a chat identifier to the chat session. The chat interface 210 may also maintain a communication with the chat client 170 until the chat session is terminated by either the chat module 132 or the chat client 170. As such, the chat module 132 may receive an utterance 232 from a user of the service provider server 130 (e.g., the user 140) via the chat interface 210 during a chat session. The utterance 232 may include a question, a phrase, and/or a sentence in a natural language format, and may be referred to as a "query" or a "user query." The chat module 132 may use the conversation module 208 to generate a response 240 to the user query 232, in a way to carry a conversation (e.g., one or more turns of questions and answers, etc.) with the user.

In order to enhance the ability of the conversation module 208 to generate the response 240 to the utterance 232, the chat module 132 may use the RAG framework as discussed herein to provide enriched information that is relevant to the user query 232 to the conversation module 208. For example, the chat module 132 may use the query generation module 202, the retrieval module 204, and the evaluation module 206 to obtain information (e.g., documents) from the database 212 that is relevant to the user query 232, and provide the information to the conversation module 208 for generating the response 240. Since the user query 232 is typically directed toward information related to an organization associated with the service provider server 130, the chat module 132 may compile data associated with the organization, and store the data in the database 212. The compiled data may include documents (or portions of different documents) related to the organization, such as white papers generated by the organization, webpages of a website of the organization, articles and instruction manuals associated with the organization, etc.). In some embodiments, when a document includes different contents corresponding to different topics, the chat module 132 may divide the document into multiple chunks (e.g., dividing the document into multiple documents) and store the different chunks separately as different documents. The information that is retrieved from the database 212 can be provided to the conversation module 208 as a prompt, which would assist the conversation module 208 to generate the response 240 to the user query 232.

Since the response 240 is generated by the conversation module 208 using content included in the information provided under the RAG framework, the quality of the response 240 is largely dependent on the quality of the information (e.g., the amount of information, the relevancy of the information to the user query 232, etc.) provided to the conversation module 208. It has been contemplated that using only the user query 232 to retrieve (e.g., query) documents from the database 212 may not be sufficient. For example, due to different factors related to the quality of the user query 232, the retrieved documents may be low in quality (e.g., a small amount of documents or the documents include substantial irrelevant information due to the words or phrases included in the user query 232, etc.). As such, the chat module 132 may use the query generation module 202, the retrieval module 204, and the evaluation module 206 to improve the quality of the documents that is retrieved from the database 212 based on the user query 232.

For example, due to the limitations of the user query 232, the chat module 132 may use the query generation module 202 to generate additional queries 234 based on the user query 232. The additional queries 232 may be generated by modifying the user query 232. For example, the user generation module 202 may replace one or more words with similar meanings in the user query (e.g., replacing "payment" with "transaction," replacing "how" with "what are the steps for," replacing "generate" with "create," etc.). The query generation module 202 may also generate additional queries by adding context information to the user query. Since the user query 232 may be part of a sequence of dialogues between the user and a chat module 132, the query generation module 202 may analyze the dialogues between the user and the chat module 132 prior to receiving the user query 232 to generate a context. The query generation module 202 may then generate one or more additional queries by incorporating the context into the user query 232. For example, if the user refers to a particular payment transaction with the chat module 132 before submitting the user query 232, the query generation module 202 may generate one or more additional queries by adding the identifier of the particular payment transaction to the user query.

In some embodiments, if the query generation module 202 includes one or more parameters that specify the scope of variability of the additional queries (e.g., to what extent the additional queries are different from the original user query 232, etc.), the chat module 132 may configured the query generation module 202 using one or more parameters that specify a broad scope of variability (e.g., a broadest scope of variability, etc.), such that a more variety of additional queries can be generated. By configuring the query generation module 202 using one or more parameters that specify a broader scope of variability, a larger amount of information (e.g., a larger number of documents) can be retrieved. The retrieval module 204 may then use the original query 232 and the additional queries 234 to retrieve documents 236 from the database 212 which can be used by the conversation module 208 to generate the response 240 for the user query 232.

However, it has been contemplated that the documents 236 retrieved based on the original user query 232 and the additional queries 234 may include documents/information that are not relevant to the user query 232, especially since the query generation module 202 is configured to take a liberal approach in generating the additional queries 234 (e.g., the additional queries 234 may include queries that substantially deviate from the original user query 232, etc.). As such, the chat module 132 may use the evaluation module 206 to evaluate the relevancy of each of the documents 236 retrieved from the database 212 with respect to the original user query 232. In some embodiments, the evaluation module 206 is a machine learning model (e.g., a large language model) that is trained by the training module 214 to determine a relevancy between a query and a document. As such, the chat module 132 may provide the user query 232 and a document from the retrieved documents 236 as inputs to the evaluation module 206 to determine whether the document is relevant to the user query 232. In some embodiments, the evaluation module 206 outputs a binary classification (e.g., relevant or not relevant) based on the user query 232 and a document, indicating whether the document is relevant to the user query 232 or not. In some embodiments, the evaluation module 206 outputs a score (e.g., a relevancy score) indicating an extent of relevancy between the user query 232 and the document.

The chat module 132 may use the evaluation module 206 to evaluate each document in the retrieved documents 236 (or only documents that were retrieved based on any one of the additional queries 234, but not the original user query 232). Based on the outputs from the evaluation module 206, the chat module 132 may select only the documents 238 that are determined to be relevant to the user query 232 (e.g., having an output that indicates that the document is relevant to the user query 232 or having a relevancy score above a threshold). The chat module 132 may then generate a prompt that includes the user query 232 (but not the additional queries 234) and the selected documents 238, and provide the prompt to the conversation module 208. Based on the prompt, the conversation module 208 may generate a response 240 to the user query 232 using content included in the documents 238. The chat module 132 may provide the response 240 to the user via the chat session.

Figure 3:
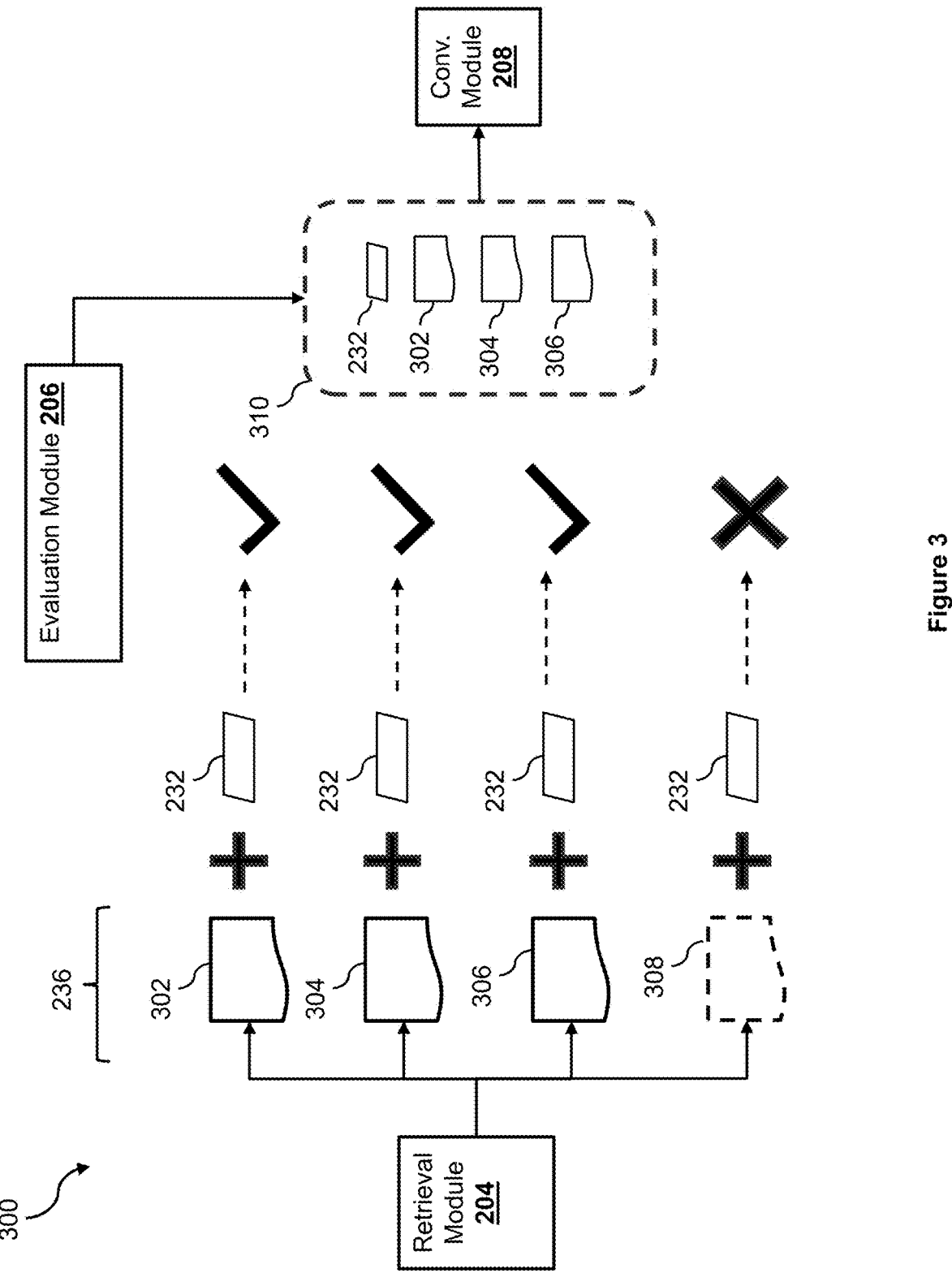
FIG. 3 illustrates an example operation for selecting relevant documents according to an embodiment of the present disclosure.

FIG. 3 illustrates an example operation 300 of selecting relevant documents using the evaluation module 206 according to various embodiments of the disclosure. As shown, the retrieval module 204 has retrieved the documents 236 from the database 212 based on the user query 232 and the additional queries 234. The documents 236 may include documents 302, 304, 306, and 308. The chat module 132 may use the evaluation module 206 to evaluate each of the documents 302, 304, 306, and 308 to determine whether each of the documents 302, 304, 306, and 308 is relevant to the user query 232. As such, the chat module 132 may provide each query/document pair to the evaluation module 206, such as the document 302 with the query 232, the document 304 with the query 232, the document 306 with the query 232, and the document 308 with the query 232, to the evaluation module 206. The evaluation module 206 may determine whether each of the documents 236 is relevant to the user query 232. For example, the evaluation module 206 may determine that the documents 302, 304, and 306 are relevant to the user query 232, and that the document 308 is not relevant to the user query 232. As such, the chat module 132 may select only the documents 302, 304, and 306 from the documents 236, and generate a prompt 310 that includes the user query 232 and the selected documents 302, 304, and 306 for the conversation module 208. The conversation module 208 may then generate the response 240 based on the prompt.

Figure 4:
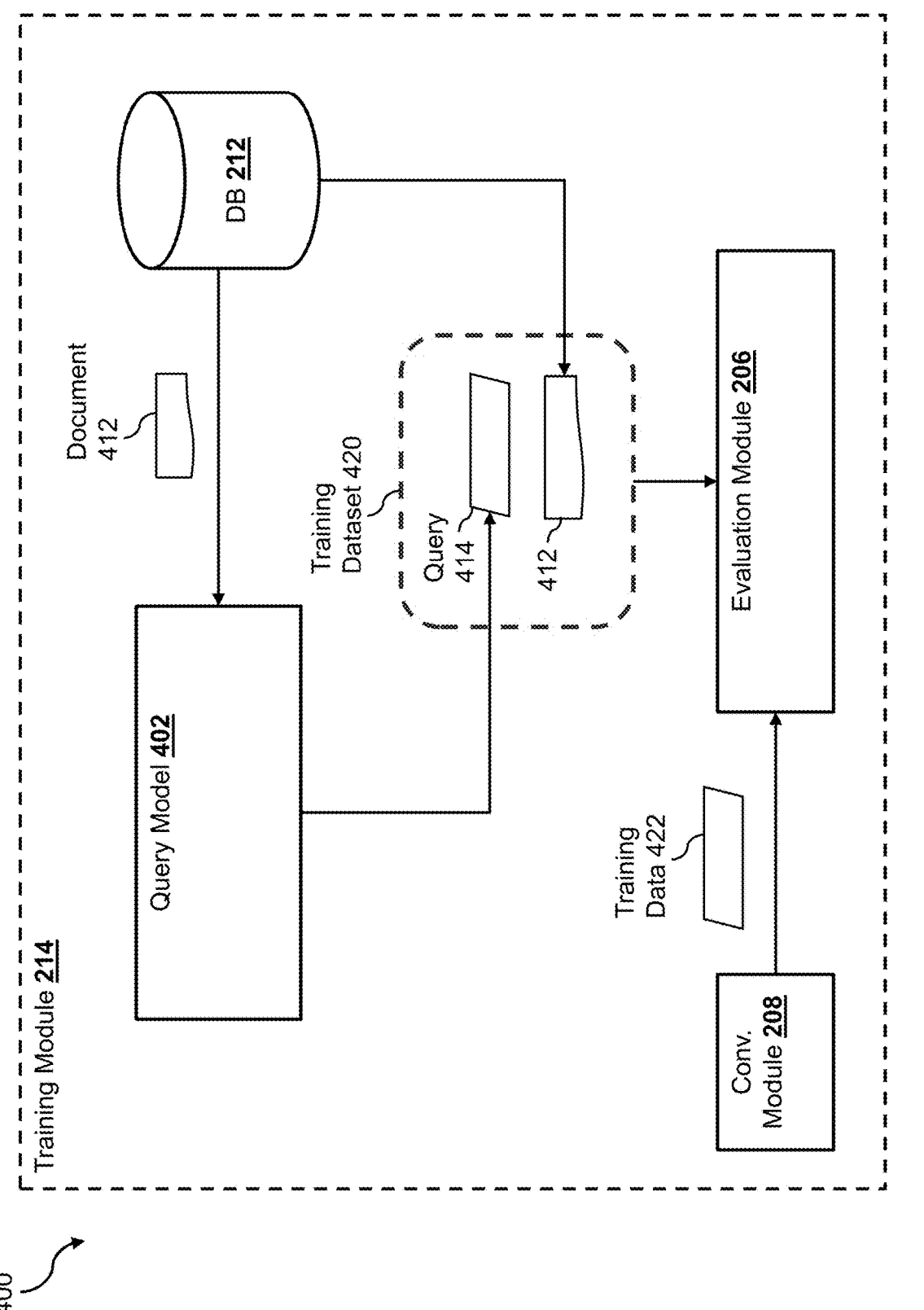
FIG. 4 illustrates a sequence of operations for training a machine learning model for evaluating documents according to an embodiment of the present disclosure.

FIG. 4 illustrates sequence of operations 400 for training the evaluation module 206 according to various embodiments of the disclosure. As discussed herein, the evaluation model may be implemented as a machine learning model (e.g., a large language model, etc.). In some embodiments, the evaluation module 206 is trained by the training module 214 in two separate phases. In the first (e.g., initial) training phase, the training module 214 may use a reverse labeling technique to generate a first or initial set of training data 420. For example, the training module 214 may retrieve documents, such as a document 412, from the corpus of the RAG framework. The training module 214 may then generate a query for each of the document (e.g., a query 414 for the document 412). In some embodiments, the training module 214 may include a query model 402 (which can be implemented as a large language model) that is configured and trained to generate the queries for the documents (e.g., the query 414 for the document 412). For example, the training module 214 may provide the document 412 to the query model 402. By analyzing the content of the document 412, the query model 402 may be trained to generate the query 414 that is relevant to the document 412. For example, when the document 412 includes information and/or instructions on how to reset a password, the query model 402 may be trained to generate the query 414 related to a question, such as "how do I reset a password?".

In some embodiments, the query model 402 of the training module 214 may be trained using a few-shot learning technique. Since it is time consuming for a human agent to generate queries based on the content of the documents (for training data to train the query model 402), the training module 214 may obtain queries generated by the human agent based on only a few sample (e.g., less than a threshold) of documents. In order to maximize the training performance using only a few labeled training data sets (e.g., the human agent generated queries and the documents), the training module 214 may obtain documents that cover a wide variety of topics for the human agent to generate the queries. The training module 214 may then use the query/document pairs to train the query model 402 based on the few-shot learning technique.

After using the query model 402 to generate queries for the documents, the training module 214 may generate training data for the evaluation module. For example, the training module may generate a training dataset 420 by pairing the document 412 and the corresponding query 414 generated for the document 412 by the query model 402. The training module 214 may also assign a positive label to the document 412, indicating that the document 412 is relevant to the query 414 (since the query 414 was generated specifically based on the document 412, the training module 214 may determine that the document 412 is relevant to the query 414). The training module 214 may generate multiple training datasets based on different document/query pairs, and use the training datasets (including the training dataset 420) to train the evaluation module 206. For example, the training module may provide the query 414 and the document 412 as input data to the evaluation module 206, and provide feedback to the evaluation module 206 based on an output of the evaluation module 206 (e.g., providing a positive feedback if the output indicates that the document 412 is relevant to the query 414, and providing a negative feedback if the output indicates that the document 412 is not relevant to the query 414).

The evaluation module 206 may then be deployed for evaluating the documents retrieved by the retrieval module 204. For example, as the retrieval module 204 retrieves a set of documents 236 based on the original user query and the additional queries generated by the query generation module 202, the evaluation module 206 may evaluate each of the documents in the set of documents 236 to determine if the document is relevant to the original user query 232. The retrieval module 204 may provide the original user query 232 and a document from the set of documents (e.g., the document 302, the document 304, the document 306, or the document 308, etc.) as input data to the evaluation module 206, and may obtain an output (e.g., a relevancy score) indicating a relevancy of the document to the original user query 232. The retrieval module 204 may use the evaluation module 206 to evaluate each of the documents, and only retain the documents having a relevancy score above a threshold.

In some embodiments, the training module 214 continues to train the evaluation module 206 after the initial training phase in an ongoing basis. For example, after deploying the evaluation module 206, the training module 214 may continue to monitor the dialogues exchanged between the chat module 132 and the various users. In some embodiments, after the conversation module 208 provides a response to a user query, the training module 214 monitors and analyzes the reaction from the user, and determines whether the user provides a positive or a negative feedback to the response. For example, if the user repeats or rewords the user query after the conversation module 208 provides a response, the training module 214 may determine that a negative feedback is provided to the response. On the other hand, if the user replies with an affirmative utterance such as an indication of an understanding of the response (e.g., "got it," etc.) or an appreciation of the response (e.g., "thank you," "thanks," etc.), the training module 214 may determine that a positive feedback is provided to the response. The training module 214 may then generate additional training data 422 based on the user query and the documents that were used by the AI model to generate the response. For example, the training module 214 may generate a training dataset based on one of the documents (e.g., the documents 236) used by the conversation module 208 to generate the response 240 and the original user query 232 for which the response 240 is generated. The training module 214 may label the document in the training dataset with a label that corresponds to the feedback from the user (e.g., a positive label when a positive feedback is received from the user, a negative label when a negative feedback is received from the user, etc.). The training module 214 may then re-train the evaluation module 206 based on the training data 422 generated using real-world feedback data.

In some embodiments, the training module 214 may also use an unsupervised feedback loop to continue to fine-tune the evaluation module 206 as the evaluation module 206 is being used by the chat module 132 to refine the documents before feeding to the conversation module 208. The training module 214 may provide each pair of query and document from the training datasets (e.g., the training dataset 420, the training data 422, etc.) as input data to the conversation module 208. When the conversation module 208 generates a response to the query, the training module 214 may calculate a confidence score indicating a confidence level that the response answers the query. In some embodiments, the training module 214 may generate the confidence score based on the last layer within the neural network structure of the conversation module 208. For example, the training module 214 may calculate the confidence score based on an entropy of the token values in the last layer of the neural network structure when the conversation module 208 generates the response.

Based on the confidence score, the training module 214 may reinforce the training of the evaluation module 206 using one or more methods. For example, the training module 214 may select the query/document pairs having confidence scores above a threshold, and re-train the evaluation module 206 based on the selected query/document pairs (e.g., adjusting the parameters of the evaluation module such that the evaluation module will produce a positive output based on the query/document pairs). In another example, the training module 214 may provide feedback to the evaluation module 206 using a binary-cross-entropy loss between a softmax score of the "yes" token in the last layer of the neural network structure of the conversation module 208 and the generated confidence score. Using real-world feedback data and confidence scores generated based on the conversation module 208 to continue to re-train (fine-tune) the evaluation module 206, the performance of the evaluation module 206 will continue to improve, resulting in a higher quality of responses produced by the conversation module 208.

FIG. 5 illustrates a process 500 for facilitating an automated conversation between a chat system and a user using the RAG framework according to various embodiments of the disclosure. In some embodiments, at least a portion of the process 500 is performed by the chat module 132, although one or more steps may be performed by one or more of the components/devices/modules/systems described herein. The process 500 begins by receiving (at step 505) a first query from a device. For example, the chat module 132 may receive the utterance from a user (e.g., the user 140 of the user device 110) via the chat interface 210 during a chat session established between the chat module 132 and the device. The utterance 232 may indicate a type of information desired by the user submitting the utterance 232 (e.g., including a user query).

Instead of providing the first query directly to the conversation module 208 to generate the response 240 to the utterance 232, the chat module 132 of some embodiments generates (at step 510) multiple second queries based on the first query. For example, since the utterance 232 generated by the user may not be sufficient in retrieving the necessary information for the conversation module 208 to generate the response 240 due to different factors (e.g., limited choice of words, missing context, etc.). As such, the chat module 132 may use the query generation module 202 to generate additional queries 234 based on the user query 232. The additional queries may be generated based on replacing one or more words in the utterance 232 with different words. The additional queries may also be generated based on incorporating a context derived from a dialogue between the user and the chat module 132. The query generation module 202 may be configured to generate a wide variety of queries that deviates from the original user query 232.

The chat module 132 then uses the retrieval module 204 to retrieve (at step 515) documents based on the first query and the second queries. For example, the chat module 132 may iteratively provide the original user query 232 and each of the additional queries 234 to the query generation module 202. The query generation module 202 may query the database 212 using each of the queries to obtain a corresponding set of documents. As such, the chat module 132 may obtain multiple sets of documents based on the user query 232 and the additional queries 234.

The chat module 132 uses the evaluation module 206 to evaluate (at step 520) the documents. The evaluation module 206 may be configured and trained to determine whether a document is relevant to a particular query. By providing the original user query 232 and a document retrieved by the retrieval module 204 to the evaluation module 206, the evaluation module 206 may provide an output that indicates whether the document is relevant to the user query 232.

If one or more documents are determined to be irrelevant to the user query 232 at step 525, the chat module 132 may remove (at step 530) the one or more irrelevant documents. The chat module 132 then generates (at step 535) a prompt for an AI model based on the first query and the documents, and provides the prompt to the AI model. For example, the chat module 132 may generate a prompt 310 that includes the original user query 232 and the documents that are retrieved by the retrieval module 204 and that are determined to be relevant to the user query 232 by the evaluation module 206 (e.g., the documents 302, 304, and 306), but not the documents that are determined to be irrelevant to the user query 232 (e.g., the document 306). The chat module 132 may provide the prompt 310 to the conversation module 208 for generating the response 240 to the user query 232.

The chat module 132 then provides (at step 540) a response to the device based on an output from the AI model. For example, the conversation module 208 may generate the response 240 based on the prompt 310. In some embodiments, the conversation module 208 may generate content in the response 240 using the information included in the documents 302, 304, and 306 for answering the user query 232. After generating the response 240, the chat module provides the response 240 to the device that transmitted the user query 232.

FIG. 6 illustrates a process 600 for training the evaluation module of the RAG framework according to various embodiments of the disclosure. In some embodiments, at least a portion of the process 600 is performed by training module 214 of the chat module 132, although one or more steps may be performed by one or more of the components/devices/modules/systems described herein. The process 600 begins by receiving (at step 605) a first document from a document repository and generating (at step 610) a first query based on the first document. For example, the training module 214 may retrieve the document 412 from the database 212. The training module 214 may use the query model 402 to generate a query 414 based on the document 412, where the query model 402 is configured and trained to generate a query that is relevant to a given document based on the content from the document, such that the content (or part of the content) provides the information requested in the query.

The training module 214 then generates (at step 615) a first training dataset based on the first query and the first document, and provides a positive label to the first training dataset. For example, the training module 214 may generate the training dataset 420 that includes the query 414 and the corresponding document 412. Since the query 414 is generated based on the content included in the document 412, the training module 214 may determine that the document 412 is relevant to the query 414 (e.g., includes content that can answer the query 414). As such, the training module 214 may also associate a positive label with the document 412 in the training dataset 420. The chat module 214 then uses (at step 620) the first training dataset (e.g., the training dataset 420) to train the evaluation module 206.

After deploying the evaluation module 206, the training module 214 may continue to monitor the interactions between the chat module 132 and various uses during various chat sessions. For example, the training module 214 retrieves (at step 625) a second document that the AI model (e.g., the conversation module 208) used to generate a response for a second query, and generates (at step 630) a second training dataset based on the second document and the second query. For example, after the conversation module 208 provides a response to a user, the training module 214 may monitor a reaction from the user. Based on the reaction from the user, the training module 214 may determine whether the user provides a positive feedback or a negative feedback on the response. The training module 214 may then generate the training data 422 based on the second query, the second document, and the feedback from the user. For example, if it is determined that a positive feedback is received from the user, the training module 214 may assign a positive label to the second document. Conversely, if it is determined that a negative feedback is received from the user, the training module 214 may assign a negative label to the second document. The training module 214 then uses (at step 635) the second training dataset to train the evaluation module 206.

Figure 7:
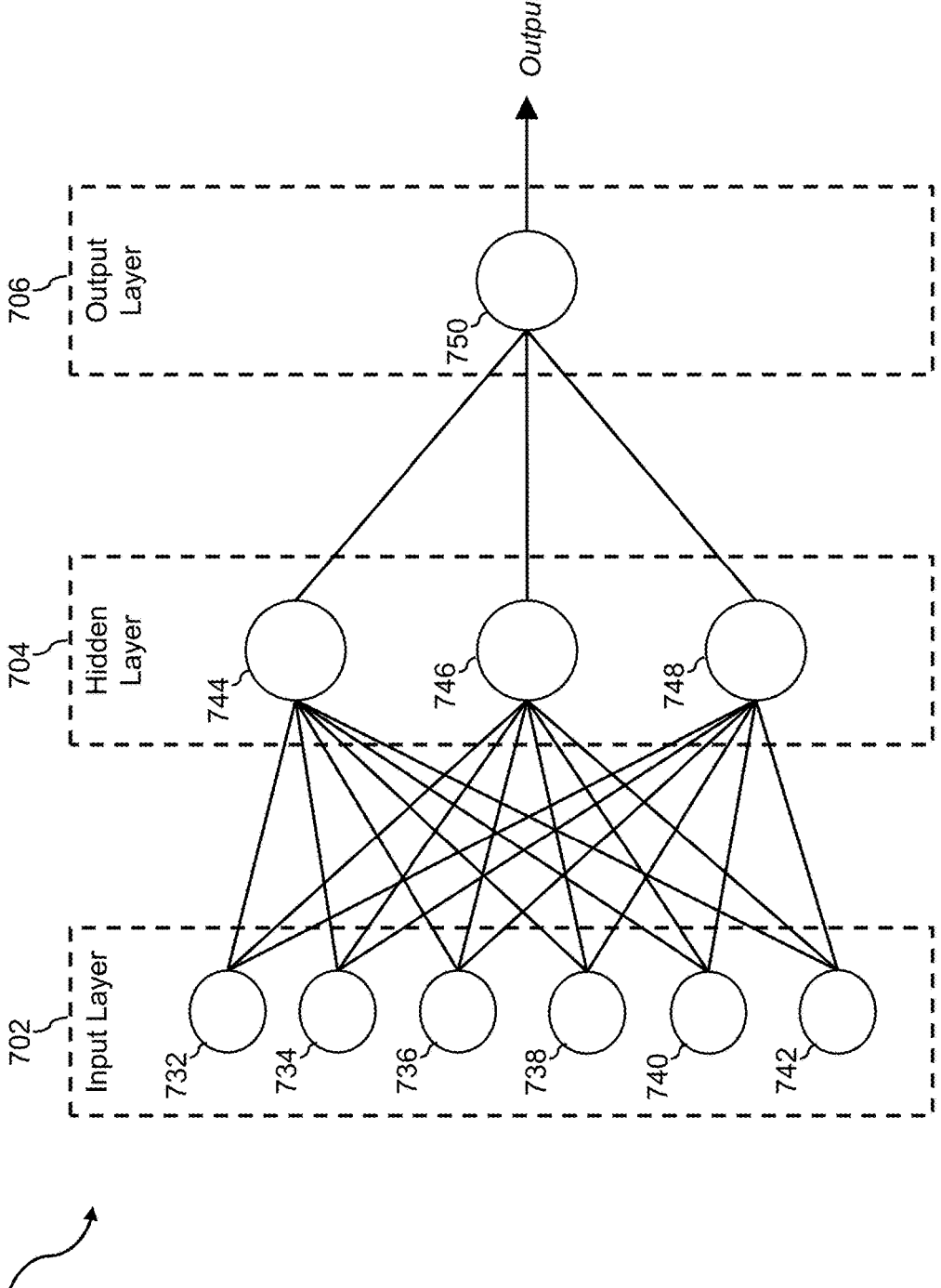
FIG. 7 illustrates an example neural network that can be used to implement a machine learning model according to an embodiment of the present disclosure.

FIG. 7 illustrates an example artificial neural network 700 that may be used to implement a machine learning model, such as the query generation module 202, the evaluation module 206, the query model 402 of the training module 214, and the conversation module 208. As shown, the artificial neural network 700 includes three layers—an input layer 702, a hidden layer 704, and an output layer 706. Each of the layers 702, 704, and 706 may include one or more nodes (also referred to as "neurons"). For example, the input layer 702 includes nodes 732, 734, 736, 738, 740, and 742, the hidden layer 704 includes nodes 744, 746, and 748, and the output layer 706 includes a node 750. In this example, each node in a layer is connected to every node in an adjacent layer via edges and an adjustable weight is often associated with each edge. For example, the node 732 in the input layer 702 is connected to all of the nodes 744, 746, and 748 in the hidden layer 704. Similarly, the node 744 in the hidden layer is connected to all of the nodes 732, 734, 736, 738, 740, and 742 in the input layer 702 and the node 750 in the output layer 706. While each node in each layer in this example is fully connected to the nodes in the adjacent layer(s) for illustrative purpose only, it has been contemplated that the nodes in different layers can be connected according to any other neural network topologies as needed for the purpose of performing a corresponding task.

The hidden layer 704 is an intermediate layer between the input layer 702 and the output layer 706 of the artificial neural network 700. Although only one hidden layer is shown for the artificial neural network 700 for illustrative purpose only, it has been contemplated that the artificial neural network 700 used to implement any one of the computer-based models may include as many hidden layers as necessary. The hidden layer 704 is configured to extract and transform the input data received from the input layer 702 through a series of weighted computations and activation functions.

In this example, the artificial neural network 700 receives a set of inputs and produces an output. Each node in the input layer 702 may correspond to a distinct input. For example, when the artificial neural network 700 is used to implement the query generation module 202, the nodes in the input layer 702 may correspond to representations of a user query (e.g., the user query 232), such as words or tokens representing the words in the user query, semantic representations (e.g., vectors) of the user query, or others. In another example, when the artificial neural network 700 is used to implement the evaluation module 206, the nodes in the input layer 702 may correspond to representations of a pair of user query (e.g., the user query 232) and a document. In another example, when the artificial neural network 700 is used to implement the query model 402 of the training module 214, the nodes in the input layer 702 may correspond to representations of a document. In another example, when the artificial neural network 700 is used to implement the conversation module 208, the nodes in the input layer 702 may correspond to representations of a prompt (e.g., the prompt 310), which may be generated based on a user query and a set of documents.

In some embodiments, each of the nodes 744, 746, and 748 in the hidden layer 704 generates a representation, which may include a mathematical computation (or algorithm) that produces a value based on the input values received from the nodes 732, 734, 736, 738, 740, and 742. The mathematical computation may include assigning different weights (e.g., node weights, edge weights, etc.) to each of the data values received from the nodes 732, 734, 736, 738, 740, and 742, performing a weighted sum of the inputs according to the weights assigned to each connection (e.g., each edge), and then applying an activation function associated with the respective node (or neuron) to the result. The nodes 744, 746, and 748 may include different algorithms (e.g., different activation functions) and/or different weights assigned to the data variables from the nodes 732, 734, 736, 738, 740, and 742 such that each of the nodes 744, 746, and 748 may produce a different value based on the same input values received from the nodes 732, 734, 736, 738, 740, and 742. The activation function may be the same or different across different layers. Example activation functions include but not limited to Sigmoid, hyperbolic tangent, Rectified Linear Unit (ReLU), Leaky ReLU, Softmax, and/or the like. In this way, after a number of hidden layers, input data received at the input layer 702 is transformed into rather different values indicative data characteristics corresponding to a task that the artificial neural network 700 has been designed to perform.

In some embodiments, the weights that are initially assigned to the input values for each of the nodes 744, 746, and 748 may be randomly generated (e.g., using a computer randomizer). The values generated by the nodes 744, 746, and 748 may be used by the node 750 in the output layer 706 to produce an output value (e.g., a response to a user query, a prediction, etc.) for the artificial neural network 700. The number of nodes in the output layer depends on the nature of the task being addressed. For example, in a binary classification problem, the output layer may consist of a single node representing the probability of belonging to one class (as in the example shown in FIG. 7). In a multi-class classification problem, the output layer may have multiple nodes, each representing the probability of belonging to a specific class. When the artificial neural network 700 is used to implement the evaluation module 206, the output node 750 may be configured to generate a classification of a document, indicating whether the document is relevant to the user query or not. When the artificial neural network 700 is used to implement the query generation module 202, the output node 750 (or multiple output nodes) may be configured to generate representation of one or more queries that are deviations from a user query. When the artificial neural network 700 is used to implement the conversation module 208, the output node 750 (or multiple output nodes) may be configured to generate representation of a response to a user query. When the artificial neural network 700 is used to implement the model 402 of the training module 214, the output node 750 (or multiple output nodes) may be configured to generate representation of a query generated based on a corresponding document.

In some embodiments, the artificial neural network 700 may be implemented on one or more hardware processors, such as CPUs (central processing units), GPUs (graphics processing units), FPGAs (field-programmable gate arrays), Application-Specific Integrated Circuits (ASICs), dedicated AI accelerators like TPUs (tensor processing units), and specialized hardware accelerators designed specifically for the neural network computations described herein, and/or the like. Example specific hardware for neural network structures may include, but not limited to Google Edge TPU, Deep Learning Accelerator (DLA), NVIDIA AI-focused GPUs, and/or the like. The hardware used to implement the neural network structure is specifically configured based on factors such as the complexity of the neural network, the scale of the tasks (e.g., training time, input data scale, size of training dataset, etc.), and the desired performance.

The artificial neural network 700 may be trained by using training data based on one or more loss functions and one or more hyperparameters. By using the training data to iteratively train the artificial neural network 700 through a feedback mechanism (e.g., comparing an output from the artificial neural network 700 against an expected output, which is also known as the "ground-truth" or "label"), the parameters (e.g., the weights, bias parameters, coefficients in the activation functions, etc.) of the artificial neural network 700 may be adjusted to achieve an objective according to the one or more loss functions and based on the one or more hyperparameters such that an optimal output is produced in the output layer 706 to minimize the loss in the loss functions. Given the loss, the negative gradient of the loss function is computed with respect to each weight of each layer individually. Such negative gradient is computed one layer at a time, iteratively backward from the last layer (e.g., the output layer 706 to the input layer 702 of the artificial neural network 700). These gradients quantify the sensitivity of the network's output to changes in the parameters. The chain rule of calculus is applied to efficiently calculate these gradients by propagating the gradients backward from the output layer 706 to the input layer 702.

Parameters of the artificial neural network 700 are updated backwardly from the last layer to the input layer (backpropagating) based on the computed negative gradient using an optimization algorithm to minimize the loss. The backpropagation from the last layer (e.g., the output layer 706) to the input layer 702 may be conducted for a number of training samples in a number of iterative training epochs. In this way, parameters of the artificial neural network 700 may be gradually updated in a direction to result in a lesser or minimized loss, indicating the artificial neural network 700 has been trained to generate a predicted output value closer to the target output value with improved prediction accuracy. Training may continue until a stopping criterion is met, such as reaching a maximum number of epochs or achieving satisfactory performance on the validation data. At this point, the trained network can be used to make predictions on new, unseen data, such as to predict a frequency of future related transactions.

Figure 8:
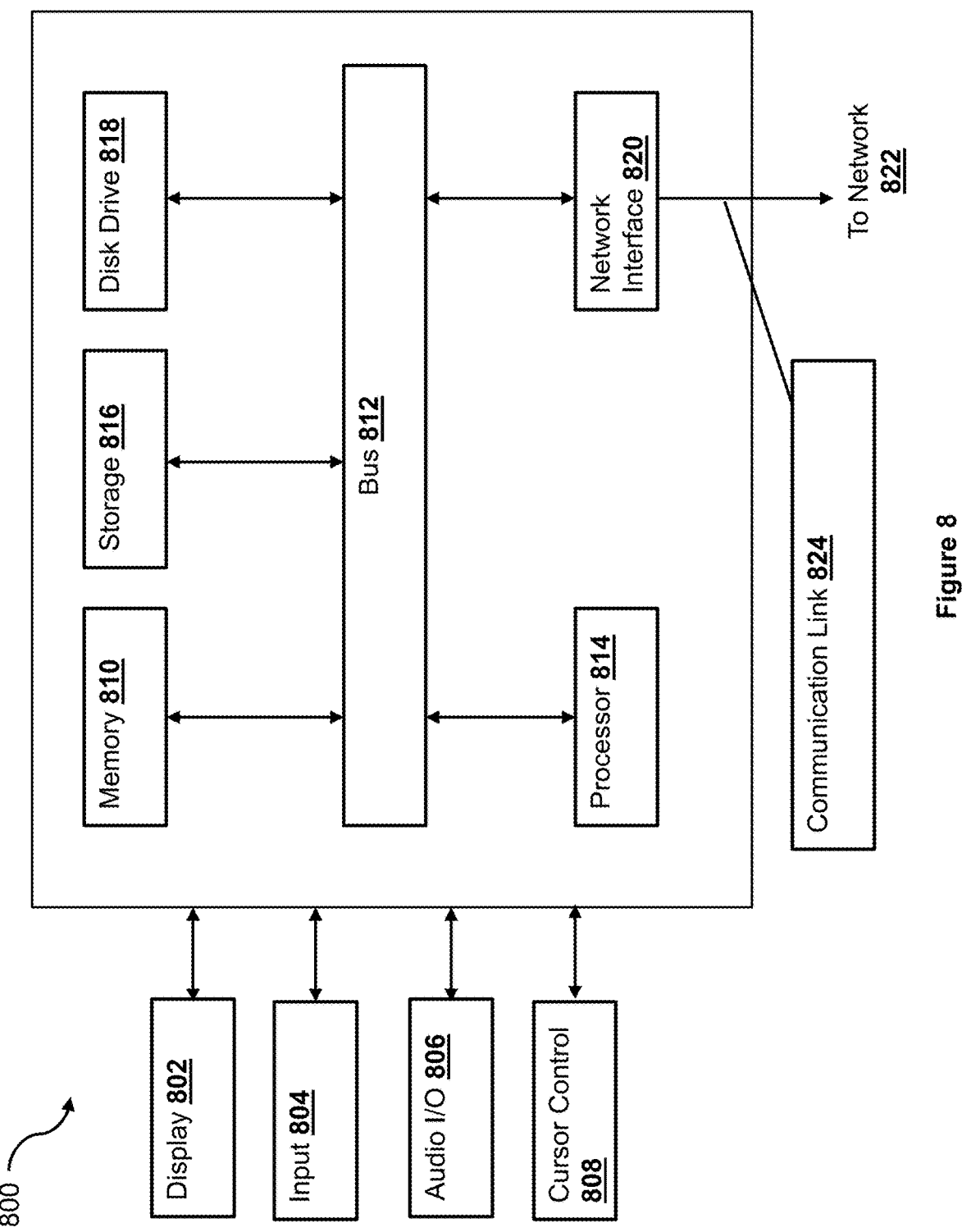
FIG. 8 is a block diagram of a system for implementing a device according to an embodiment of the present disclosure.

FIG. 8 is a block diagram of a computer system 800 suitable for implementing one or more embodiments of the present disclosure, including the service provider server 130, the merchant server 120, the user device 180, and the user device 110. In various implementations, each of the user devices 110 and 180 may include a mobile cellular phone, personal computer (PC), laptop, wearable computing device, etc. adapted for wireless communication, and each of the service provider server 130 and the merchant server 120 may include a network computing device, such as a server. Thus, it should be appreciated that the devices 110, 120, 130, and 180 may be implemented as the computer system 800 in a manner as follows.

The computer system 800 includes a bus 812 or other communication mechanism for communicating information data, signals, and information between various components of the computer system 800. The components include an input/output (I/O) component 804 that processes a user (i.e., sender, recipient, service provider) action, such as selecting keys from a keypad/keyboard, selecting one or more buttons or links, etc., and sends a corresponding signal to the bus 812. The I/O component 804 may also include an output component, such as a display 802 and a cursor control 808 (such as a keyboard, keypad, mouse, etc.). The display 802 may be configured to present a login page for logging into a user account or a checkout page for purchasing an item from a merchant. An optional audio input/output component 806 may also be included to allow a user to use voice for inputting information by converting audio signals. The audio I/O component 806 may allow the user to hear audio. A transceiver or network interface 820 transmits and receives signals between the computer system 800 and other devices, such as another user device, a merchant server, or a service provider server via a network 822. In one embodiment, the transmission is wireless, although other transmission mediums and methods may also be suitable. A processor 814, which can be a micro-controller, digital signal processor (DSP), or other processing component, processes these various signals, such as for display on the computer system 800 or transmission to other devices via a communication link 824. The processor 814 may also control transmission of information, such as cookies or IP addresses, to other devices.

The components of the computer system 800 also include a system memory component 810 (e.g., RAM), a static storage component 816 (e.g., ROM), and/or a disk drive 818

(e.g., a solid-state drive, a hard drive). The computer system 800 performs specific operations by the processor 814 and other components by executing one or more sequences of instructions contained in the system memory component 810. For example, the processor 814 can perform the automated chat functionalities described herein, for example, according to the processes 500 and 600.

Logic may be encoded in a computer readable medium, which may refer to any medium that participates in providing instructions to the processor 814 for execution. Such a medium may take many forms, including but not limited to, non-volatile media, volatile media, and transmission media. In various implementations, non-volatile media includes optical or magnetic disks, volatile media includes dynamic memory, such as the system memory component 810, and transmission media includes coaxial cables, copper wire, and fiber optics, including wires that comprise the bus 812. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 800. In various other embodiments of the present disclosure, a plurality of computer systems 800 coupled by the communication link 824 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system comprising:

a non-transitory memory; and one or more hardware processors coupled with the non-transitory memory and configured to execute instructions from the non-transitory memory to cause the system to:

receive, from a user device, a first query having a first scope and comprising a set of words;

generate, based on the first query, a plurality of second queries that collectively has a second scope broader than the first scope of the first query, wherein each query in the plurality of second queries is generated based on varying one or more words in the set of words of the first query;

retrieve a plurality of documents based on the plurality of second queries and the second scope, wherein the plurality of documents comprises more documents than a set of documents retrieved based on the first query and the first scope;

determine, using a machine learning model, that at least one document from the plurality of documents is not relevant to the first query based on a relevancy threshold;

provide the first query, the set of documents, and the plurality of documents, but excluding the at least one document, to an artificial intelligence (AI) model, wherein the AI model is configured to generate a response to the first query based on the set of documents and the plurality of documents excluding the at least one document; and transmit the response to the user device.

2. The system of claim 1, wherein each second query in the plurality of second queries is generated to provide a different variation from the first query.

3. The system of claim 1, wherein the machine learning model is configured to accept the first query and a document from the plurality of documents as inputs, and to generate, as an output, a score representing a relevancy of the document with respect to the first query.

4. The system of claim 3, wherein the document is retrieved based on one of the plurality of second queries.

5. The system of claim 1, wherein executing the instructions further causes the system to:

select a particular document from a document repository;

generate a particular query based on the particular document; and generate training data for training the machine learning model based on assigning a positive label to a combination of the particular document and the particular query, wherein the positive label indicates that the particular document is relevant to the particular query.

6. The system of claim 1, wherein executing the instructions further causes the system to:

generate training data for training the machine learning model based on assigning a negative label to a combination of the at least one document and the first query.

7. The system of claim 1, wherein executing the instructions further causes the system to:

in response to receiving a positive feedback related to the response from the user device, generate training data for training the machine learning model based on assigning a positive label to a combination of a first document from the plurality of documents and the first query; and train, using the training data, the machine learning model to determine relevance levels between documents and user-provided queries.

8. A method comprising:

receiving, by a computer system, an utterance from a user device via a chat interface;

generating, by the computer system and based on the utterance, a first query having a first scope and comprising a set of words;

generating, by the computer system, a plurality of different queries based on modifying one or more words in the set of words of the first query, wherein one or more of the plurality of queries have a second scope that is broader than the first scope;

querying, using the plurality of different queries, a database for a plurality of documents, wherein the plurality of documents comprises more documents than a set of documents retrieved based on the first query and the first scope;

determining, using a machine learning model, that at least one document from the plurality of documents is not relevant to the first query based on a set of relevancy criteria;

generating, by the computer system, a prompt for an artificial intelligence (AI) model based on the first query, the set of documents, and a subset of the plurality of documents, wherein the subset of the plurality of documents excludes the at least one document;

providing the prompt to the AI model, wherein the AI model is configured to generate a response to the utterance based on content included in the set of documents and the subset of the plurality of documents; and transmitting, by the computer system, the response to the user device via the chat interface.

9. The method of claim 8, wherein the plurality of queries is generated using a second AI model.

10. The method of claim 8, wherein the machine learning model is associated with a parameter representing a variability of output queries, and wherein the method further comprises configuring the machine learning model based on a parameter value representing a highest variability of the output queries.

11. The method of claim 8, further comprising:

retrieving a document from the database;

generating a corresponding query based on information included in the document, wherein the corresponding query is generated such that the information is usable to generate a corresponding response to the corresponding query; and generating a training dataset for training the machine learning model based on assigning a positive label to the document in a combination of the document and the corresponding query.

12. The method of claim 8, further comprising:

subsequent to transmitting the response to the user device, receiving a feedback associated with the response from the user device;

generating a training dataset for training the machine learning model based on a combination of the first query and a document from the subset of the plurality of documents; and assigning a label to the document in the training dataset based on the feedback.

13. The method of claim 12, wherein a positive label is assigned to the document when the feedback associated with the response is positive.

14. The method of claim 12, wherein a negative label is assigned to the document when the feedback associated with the response is negative.

15. A non-transitory machine-readable medium having stored thereon machine-readable instructions executable to cause a machine to perform operations comprising:

receiving an utterance from a user device;

generating, based on the utterance, a first query having a first scope and comprising a set of words;

generating a plurality of different queries based on modifying one or more words in in the set of words of the first query, wherein a second scope associated with the plurality of different queries is broader than the first scope;

querying a database for a plurality of documents based on the plurality of different queries and the second scope, wherein the plurality of documents comprises more documents than a set of documents retrieved based on the first query and the first scope;

determining, using a machine learning model, that at least one document from the plurality of documents is not relevant to the first query based on a relevancy threshold;

generating a prompt for an artificial intelligence (AI) model based on the first query, the set of documents, and a subset of the plurality of documents, wherein the subset of the plurality of documents excludes the at least one document;

providing the prompt to the AI model, wherein the AI model is configured to generate a response to the utterance based on content included in the set of documents and the subset of the plurality of documents; and transmitting the response to the user device.

16. The non-transitory machine-readable medium of claim 15, wherein the utterance is received via a chat interface established between a chat system and the user device, and wherein the response is transmitted to the user device via the chat interface.

17. The non-transitory machine-readable medium of claim 15, wherein the generating the plurality of different queries comprises generating a second query based on modifying a first word in the set of words of the first query.

18. The non-transitory machine-readable medium of claim 15, wherein the operations further comprise:

retrieving a document from the database;

generating, for the document, a corresponding query based on information included in the document, wherein the corresponding query is generated such that the information is usable to generate a corresponding response to the corresponding query; and generating a training dataset for training the machine learning model based on assigning a positive label to the document in a combination of the document and the corresponding query.

19. The non-transitory machine-readable medium of claim 15, wherein the operations further comprise:

subsequent to transmitting the response to the user device, receiving a feedback associated with the response from the user device;

generating a training dataset for training the machine learning model based on a combination of the first query and a document from the subset of the plurality of documents; and assigning a label to the document in the training dataset based on the feedback.

20. The non-transitory machine-readable medium of claim 19, wherein a positive label is assigned to the document when the feedback associated with the response is positive, and wherein a negative label is assigned to the document when the feedback associated with the response is negative.

\* \* \* \* \*